US011893798B2

(12) United States Patent
Chandran et al.

(10) Patent No.: US 11,893,798 B2
(45) Date of Patent: *Feb. 6, 2024

(54) METHOD, SYSTEM AND COMPUTER READABLE MEDIUM OF DERIVING CROWD INFORMATION

(71) Applicant: NEC Corporation, Tokyo (JP)

(72) Inventors: Arun Kumar Chandran, Singapore (SG); Wen Zhang, Shanghai (CN); Yusuke Takahashi, Singapore (SG)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,856

(22) Filed: Feb. 22, 2023

(65) Prior Publication Data

US 2023/0196783 A1 Jun. 22, 2023

Related U.S. Application Data

(63) Continuation of application No. 17/042,474, filed as application No. PCT/JP2019/008725 on Feb. 27, 2019, now Pat. No. 11,615,626.

(30) Foreign Application Priority Data

Mar. 29, 2018 (SG) .......................... 10201802668Q

(51) Int. Cl.
*G06V 20/52* (2022.01)
*G06V 10/50* (2022.01)
(Continued)

(52) U.S. Cl.
CPC .......... *G06V 20/53* (2022.01); *G06F 18/2321* (2023.01); *G06V 10/25* (2022.01); *G06V 10/50* (2022.01); *G06V 40/103* (2022.01)

(58) Field of Classification Search
None
See application file for complete search history.

(56) References Cited

U.S. PATENT DOCUMENTS 6,625,300 B1 * 9/2003 Kyo .................. G06V 10/44
382/104
7,787,656 B2 * 8/2010 Chen ............... G08B 13/19608
382/199
(Continued)

FOREIGN PATENT DOCUMENTS

JP 2005-25328 A 1/2005
JP 2010-109859 A 5/2010
(Continued)

OTHER PUBLICATIONS

International Search Report for PCT/JP2018/008725 dated, Apr. 23, 2019. (PCT/ISA/210).
(Continued)

*Primary Examiner* — Tahmina N Ansari
(74) *Attorney, Agent, or Firm* — Sughrue Mion, PLLC

(57) ABSTRACT

Methods and systems for crowd level estimation are provided. The system for crowd level estimation includes an input module and a crowd level estimation module. The input module receives an input image of a crowd and the crowd level estimation module estimates a crowd level of the crowd in the input image in response to a crowd density level.

15 Claims, 14 Drawing Sheets

(51) Int. Cl.
*G06F 18/2321* (2023.01)
*G06V 40/10* (2022.01)
*G06V 10/25* (2022.01)

(56) References Cited

U.S. PATENT DOCUMENTS

| | | | | |
|---|---|---|---|---|
| 8,116,564 | B2* | 2/2012 | Kilambi | G06M 11/00 |
| | | | | 382/103 |
| 8,509,546 | B1* | 8/2013 | Flenner | G06V 20/54 |
| | | | | 382/128 |
| 11,615,626 | B2* | 3/2023 | Chandran | G06V 10/50 |
| | | | | 382/103 |
| 11,651,493 | B2* | 5/2023 | Chandran | G06T 7/77 |
| | | | | 382/103 |
| 2006/0195199 | A1 | 8/2006 | Iwasaki et al. | |
| 2010/0322516 | A1* | 12/2010 | Xu | G06V 20/53 |
| | | | | 382/173 |
| 2016/0358027 | A1 | 12/2016 | Hotta et al. | |
| 2021/0012506 | A1* | 1/2021 | Chandran | G06T 7/11 |
| 2021/0027069 | A1* | 1/2021 | Chandran | G06F 18/2321 |
| 2021/0027202 | A1* | 1/2021 | Chandran | G06Q 10/067 |

FOREIGN PATENT DOCUMENTS

| | | |
|---|---|---|
| JP | 2014-6586 A | 1/2014 |
| JP | 2017-10224 A | 1/2017 |
| JP | 2018-22340 a | 2/2018 |
| WO | 2006/072896 A1 | 7/2006 |

OTHER PUBLICATIONS

Written Opinion of the International Searching Authority for PCT/JP2019/008725 dated, Apr. 23, 2019.

* cited by examiner

METHOD, SYSTEM AND COMPUTER READABLE MEDIUM OF DERIVING CROWD INFORMATION

CROSS REFERENCE TO RELATED APPLICATIONS

This application is a Continuation of U.S. application Ser. No. 17/042,474 filed Sep. 28, 2020, which is a National Stage of International Application No. PCT/JP2019/008725 filed Feb. 27, 2019, claiming priority based on Singapore Patent Application No. 10201802668Q, filed Mar. 29, 2018, the disclosures of which are incorporated herein in their entirety by reference.

TECHNICAL FIELD

The present disclosure generally relates to methods and systems for crowd estimation, and more particularly relates to methods and systems for estimating a crowd size or crowd level.

BACKGROUND ART

Many security systems observe areas where crowds form and it is necessary in many circumstances to estimate the size of the crowd for monitoring foot-traffic through the area or for providing services to the area to accommodate the crowd or for other reasons. There are numerous techniques that estimate crowd levels to discover the number of humans in the crowd. The techniques range from simple pixel level techniques such as background subtraction based blob counting to complex pattern recognition techniques such as body part detection and combined head pattern generation. Each technique has its own advantages and disadvantages.

A single crowd estimation technique may not be suitable for all environmental and crowd conditions. For example, background subtraction techniques have inferior performance when there is an overlap of humans (i.e., an occlusion). Similarly, body part recognition is also affected in cases of occlusions at high crowd densities, thereby reducing the accuracy of the technique. However, combined head pattern techniques are observed to perform better at high crowd densities due to the underlying concept of learning combined head patterns, yet they tend to have lower accuracies at sparse crowd levels or low crowd densities.

SUMMARY OF INVENTION

Technical Problem

Thus, what is needed is a method and system for real-time crowd level estimation which provides improved accuracy in a variety of crowd conditions and crowd locations. Furthermore, other desirable features and characteristics will become apparent from the subsequent detailed description and the appended claims, taken in conjunction with the accompanying drawings and this background of the disclosure.

Solution to Problem

According to at least one embodiment of the present disclosure, a method for crowd level estimation is provided. The method includes receiving an input image of a crowd and estimating a crowd level of the crowd in the input image in response to a crowd density level.

According to another embodiment of the present disclosure, a system for crowd level estimation is provided. The system includes an input module and a crowd level estimation module. The input module receives an input image of a crowd and the crowd level estimation module estimates a crowd level of the crowd in the input image in response to a crowd density level.

And according to yet another embodiment, a computer readable medium is provided. The computer readable medium stores a program for causing a computer to perform the method for crowd estimation. The method includes receiving an input image of a crowd and determining a region of interest within the input image of the crowd. The method further includes determining a similarity of the region of interest within the input image of the crowd to each of a plurality of models of crowd level spatial variations, each of the plurality of models of crowd level spatial variations generated by modeling spatial variations of each of a plurality of crowd levels in response to pixel density variations thereof. And finally, the method includes estimating the crowd level of the crowd in the region of interest within the input image in response to a most similar one of the plurality of models of crowd level spatial variations.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 1A depicts illustrations of front end crowd level estimation in accordance with a present embodiment, wherein FIG. 1A depicts a camera arranged to capture images of a crowd.

FIG. 1B depicts illustrations of front end crowd level estimation in accordance with a present embodiment, wherein FIG. 1B depicts images of the crowd captured by the camera.

FIG. 5A depicts graphs of error distribution for crowd estimation in accordance with the second aspect of the present embodiment, wherein FIG. 5A depicts a graph of error distribution for crowd estimation of high crowd level crowds.

FIG. 5B depicts graphs of error distribution for crowd estimation in accordance with the second aspect of the present embodiment, wherein FIG. 5B depicts a graph of error distribution for crowd estimation of low crowd level crowds.

Skilled artisans will appreciate that elements in the figures are illustrated for simplicity and clarity and have not necessarily been depicted to scale.

DESCRIPTION OF EMBODIMENTS

The following detailed description is merely exemplary in nature and is not intended to limit the present disclosure or the application and uses of the present disclosure. Furthermore, there is no intention to be bound by any theory presented in the preceding background of the invention or the following detailed description. It is the intent of the present embodiment to present methods and systems for real time robust and optimized crowd estimation. When analyzed closely, it is possible to identify and/or model multiple techniques which can complement each other. In accordance with present embodiments, methods and systems to automatically switch between these crowd estimation techniques depending on a current crowd level (low crowd level, high crowd level) and other parameters tap these advantages to provide optimized crowd estimation. Note that throughout this description, high/low crowd density refers to a discrete crowd level and should not be considered as a measure of discrete crowd density.

Figure 1A:
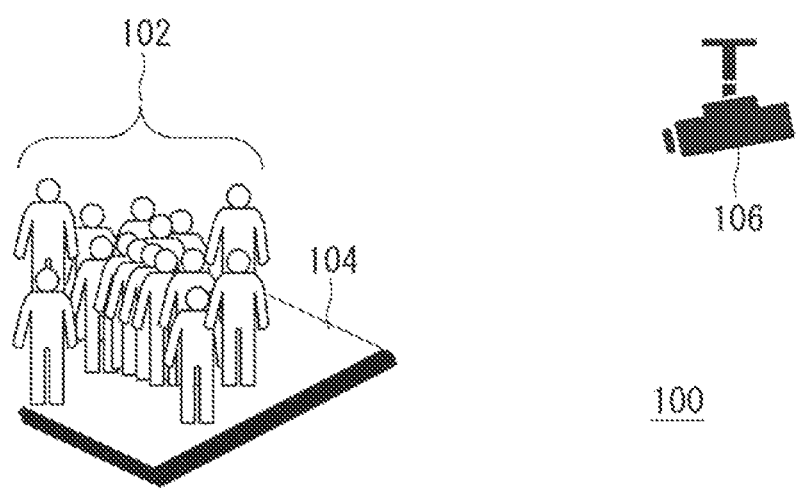
Figure 1B:
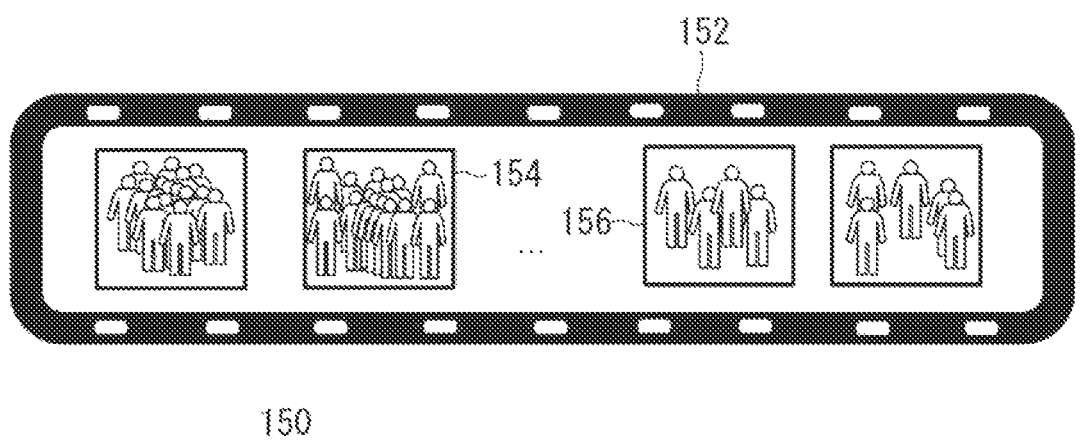

Referring to FIG. 1A, an illustration 100 depicts a crowd 102 at a location 104 and a camera 106 arranged to capture images of the crowd 102 at the location 104. FIG. 1B depicts an illustration 150 of media 152 capturing images 154, 156. The images 154 are images of a high crowd level and the images 156 are images of a low crowd level.

Figure 2:
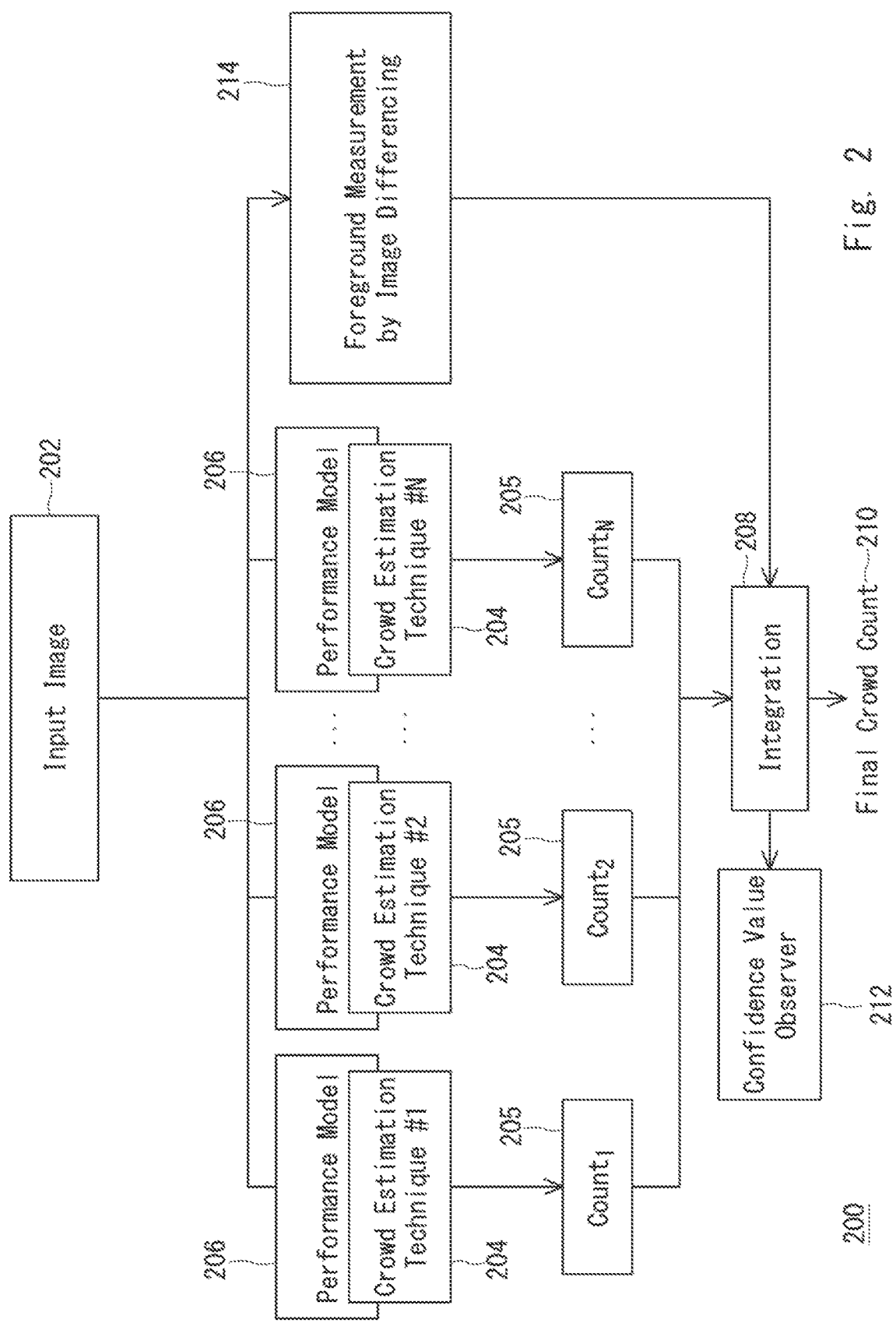
FIG. 2 depicts a diagram of a system for crowd level estimation in accordance with a first aspect of the present embodiment.

Referring to FIG. 2, a diagram 200 depicts a system for crowd estimation in accordance with a first aspect of the present embodiment. The system includes an input module 202 for receiving an image of the crowd 102. In accordance with the present embodiments, a plurality of crowd estimation technique calculators 204 receive the image of the crowd 102 from the input module 202 and estimate crowd counts 205 therefrom. An equal plurality of performance modeling modules 206 are coupled to each of the crowd estimation technique calculators 204 for modeling each of the plurality of crowd estimation techniques based on an accuracy thereof at different crowd levels and/or at different locations.

A crowd estimation technique integration module 208 selects one or more of the plurality of crowd estimation techniques in response to the performance modeling thereof and an estimated crowd level and/or an estimated location. The crowd estimation technique integration module 208 then estimates the crowd count of the crowd in the received image in accordance with the selected one or more of the plurality of crowd estimation techniques and outputs a final crowd count 210.

Accordingly, performance models of individual crowd estimation techniques are created at different crowd levels by using incoming image frames to generate the estimated crowd counts for the different crowd estimation techniques. Then, a crowd level estimation method determines which estimated crowd count to select or assign a high confidence value. In accordance with the present embodiment, the input module 202 can receive the image of the crowd and determine a region of interest within the image of the crowd. The crowd estimation technique integration module 208 then estimates one or both of the crowd level of the crowd in the region of interest within the image of the crowd or the location of the crowd in the region of interest within the image of the crowd.

Alternatively, the input module 202 can receive the image of the crowd and divide the image into a plurality of sub-regions. The input module could divide the image of the crowd into the plurality of sub-regions in consideration of a view point of the camera 106 which has captured the image or in respect of other criteria. The crowd estimation technique integration module 208 would then select one or more of the plurality of crowd estimation technique calculators 204 for each of the plurality of sub-regions in response to the performance modeling of the one or more of the plurality of crowd estimation techniques by the corresponding one of the plurality of performance modeling modules 206 and an estimated crowd level and/or an estimated location for the one of the plurality of sub-regions. The crowd estimation technique integration module 208 would then estimate the crowd count of the crowd in each of the plurality of sub-regions in accordance with the selected one or more of the plurality of crowd estimation techniques for that one of the plurality of sub-regions. Finally, the crowd estimation technique integration module 208 would combine the estimated crowd counts for each of the plurality of sub-regions to obtain the final crowd count 210 of the crowd in the received image.

In accordance with the present embodiment, the plurality of performance modeling modules 206 could assign a real-time confidence value to each of the plurality of crowd estimation techniques in accordance with the performance modeling thereof. The system may then include a confidence value observer 212 coupled to the crowd estimation technique integration module 208 for removing one of the plurality of crowd estimation technique calculators 204 from selection when the real-time confidence value of the one of the plurality of crowd estimation techniques falls below a confidence value threshold.

The crowd estimation technique integration module 208 could further select multiple ones of the plurality of crowd estimation technique calculators 204 and combine the crowd estimation results (crowd counts) 205 from the multiple crowd estimation technique calculators 204 to estimate the crowd count of the crowd in the received image. In accordance with the present embodiment, the crowd estimation technique integration module 208 can dynamically combine the crowd estimation results 205 from the multiple crowd estimation technique calculators 204 in accordance with the real-time confidence value thereof to estimate the final crowd count 210 of the crowd in the received image of the crowd 102. The crowd estimation results 205 can be combined in accordance with an inverted weighted sum approach or in accordance with a normalized weighted sum approach.

A further enhancement of the system depicted in the diagram 200 could involve adding a foreground measurement module 214 coupled between the input module 202 and the crowd estimation technique integration module 208 to measure a crowd level in a foreground of the image of the crowd to provide an estimated crowd level for use by the crowd estimation technique integration module 208 when selecting the one or more of the plurality of crowd estimation technique calculators 204.

Figure 3:
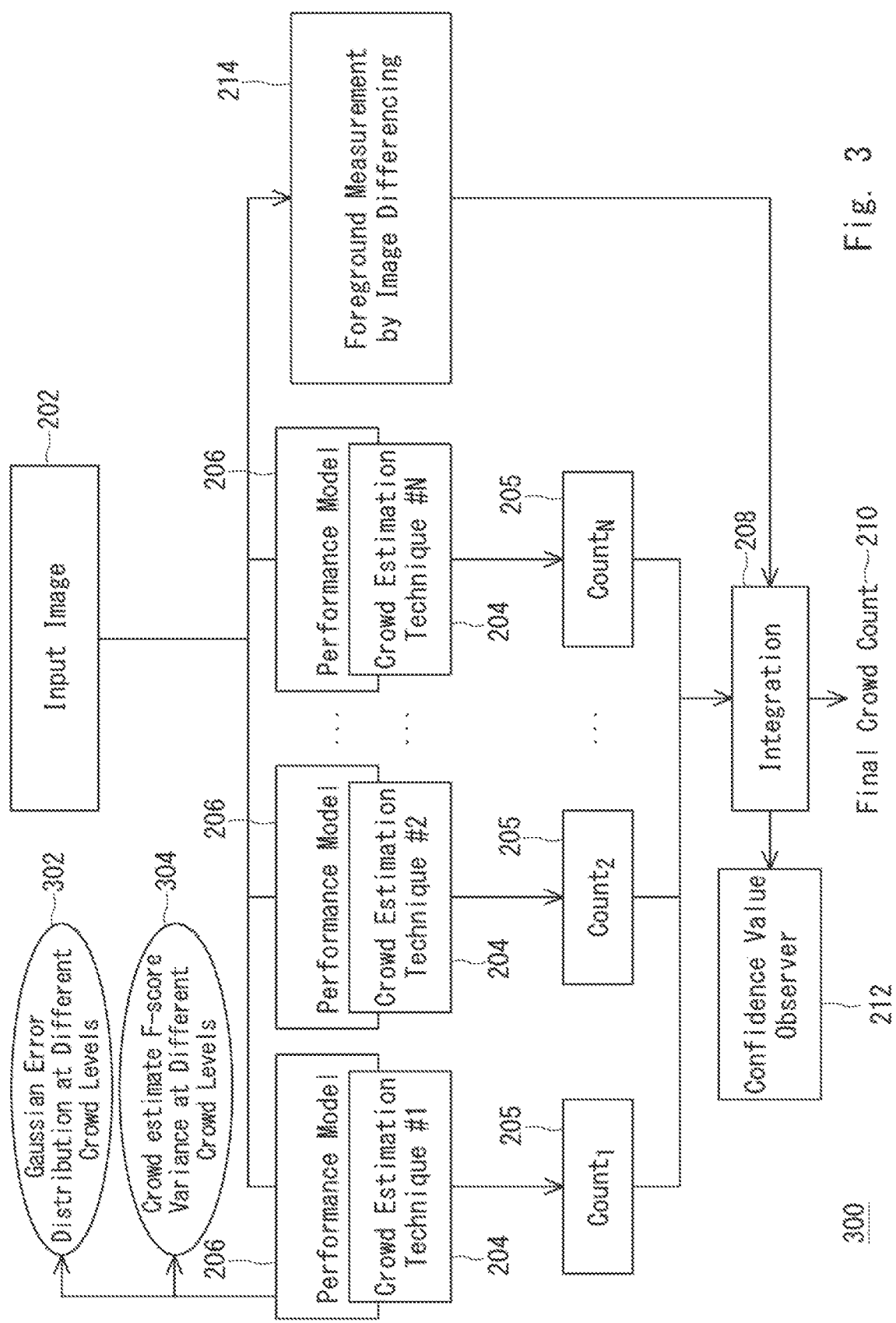
FIG. 3 depicts a diagram of a system for crowd level estimation in accordance with a second aspect of the present embodiment.

Referring to FIG. 3, a diagram 300 depicts a system for crowd level estimation in accordance with a second aspect of the present embodiment. The system depicted in the diagram 300 implements performance modeling of crowd estimation techniques by the performance modeling modules 206 for each of the one or more crowd estimation technique calculators 204 determining a plurality of performances of the corresponding crowd estimation technique calculator 204 at multiple crowd levels (e.g., HIGH crowd levels, LOW crowd levels) and modeling the performance of the crowd estimation technique calculator 204 in response to the plurality of performances of the crowd estimation technique calculator 204 at the multiple crowd levels.

Figure 4:
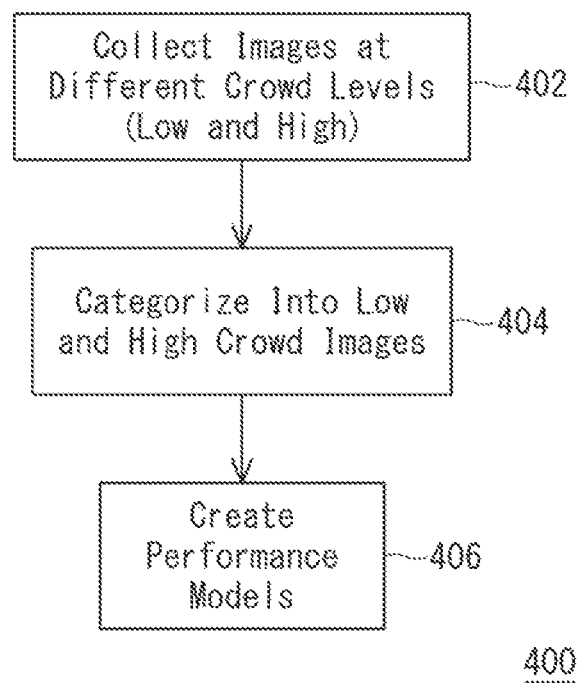
FIG. 4 depicts a flowchart of performance modelling in accordance with the second aspect of the present embodiment.

This performance modeling operation of the performance modeling modules 206 is shown in a flowchart 400 of FIG. 4. Each of the performance modeling modules 206 collect images at different crowd levels (Step 402) and categorize those images into low crowd images and high crowd images (Step 404). Each performance modeling module 206 then models the performance of the corresponding crowd estimation technique calculator 204 in response to the plurality of performances of the crowd estimation technique calculator 204 at the different crowd levels (Step 406).

Referring back to FIG. 3, the performance modeling modules 206 can also determine a plurality of performances of the corresponding crowd estimation technique calculator 204 at locations of interest and model the performance of the crowd estimation technique calculator 204 in response to the plurality of performances of the crowd estimation technique calculator 204 at the locations of interest.

In accordance with the present embodiment, a performance modeling module 206 may model the performance of a corresponding crowd estimation technique calculator 204 by determining an error distribution 302 of the plurality of performances of the crowd estimation technique, such as by determining an error of crowd counting for each of the plurality of performances and/or by determining a standard deviation of the error distribution for each of the plurality of performances of the crowd estimation technique, as an indicator of performance of the crowd estimation technique calculator 204.

Figure 5A:
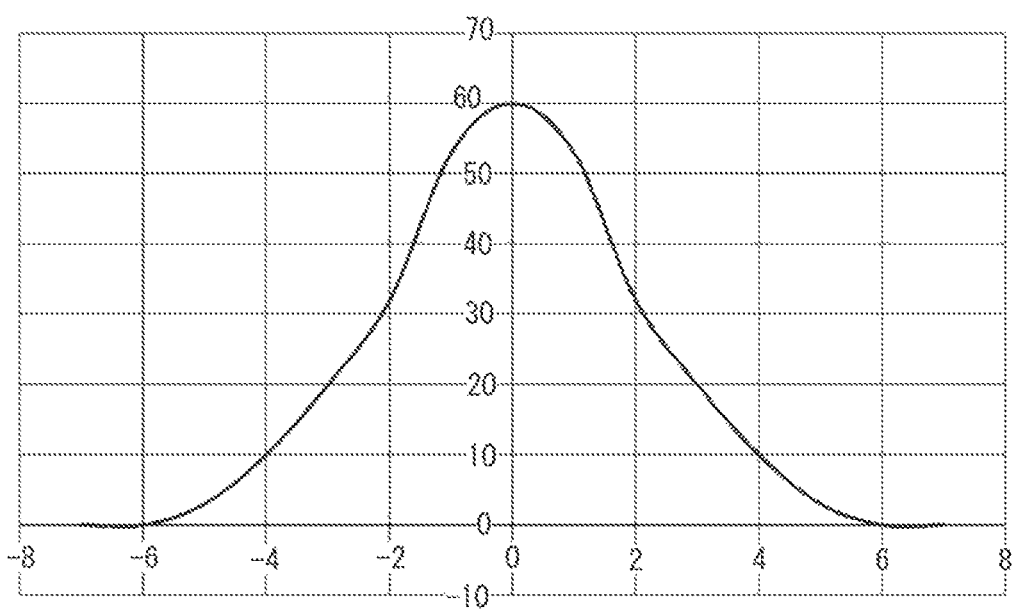
Figure 5B:
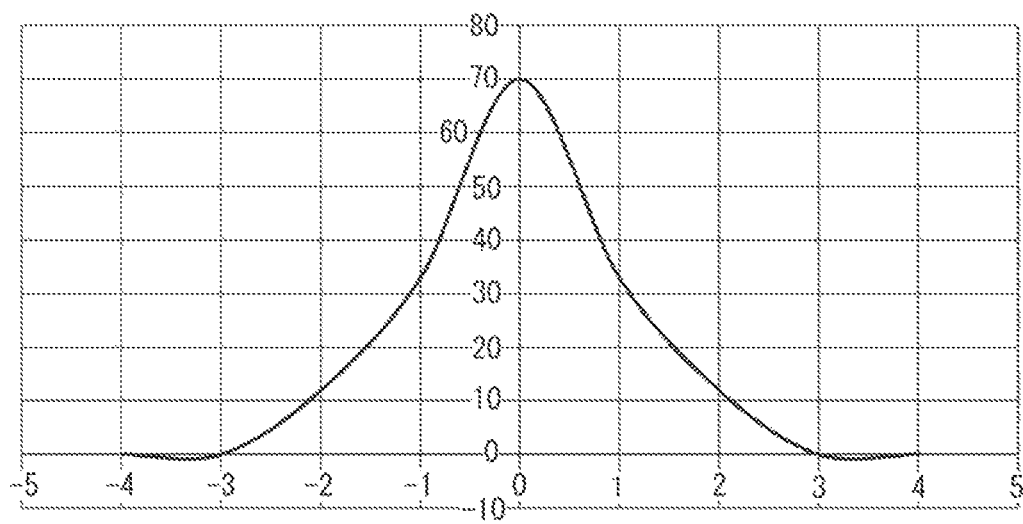

Referring to FIGS. 5A and 5B, graphs 500, 550 depict error distribution for crowd estimation in accordance with the second aspect of the present embodiment. The graph 500 depicts a graph of error distribution for crowd estimation of high crowd level crowds and the graph 550 depicts a graph of error distribution for crowd estimation of low crowd level crowds. Validation of an accuracy of the crowd estimation technique calculator 204 with image samples at different crowd levels is used by the performance modeling module 206 in accordance with the present embodiment to generate the error distribution 302 at the considered crowd levels, the error referring to the deviation in the crowd estimation from the actual number of people.

The standard deviation ($\sigma$) of the error distribution 302 indicates the suitability of the crowd estimation technique calculator 204. When the count estimate error is less, $\sigma$ is small. For low crowd level $\sigma$ as shown in the graph 550, the error distribution indicates the crowd estimation technique calculator 204 has less error for low crowd levels as compared to high crowd levels (i.e., as shown in the distribution graph 500). The calculation of the standard deviation is shown in Equation (1) below.

$$\sigma = \sqrt{\frac{\sum_{i=1}^{M}(x_i)^2}{M-1}} \qquad (1)$$

where M is the number of samples, xi is the error of the $i^{th}$ sample. The Equation (1) shows that if $\sigma_{low} \ll \sigma_{high}$, the particular crowd estimation technique calculator 204 being performance modeled by the corresponding performance modeling module 206 is suitable for low crowd level estimation.

Referring back to FIG. 3, the performance modeling module 206 may alternatively model the performance of the corresponding crowd estimation technique calculator 204 by determining an accuracy metric for the plurality of performances of the crowd estimation technique, wherein the accuracy metric may include a F-score and wherein the performance modeling module 206 determines the accuracy metric for the plurality of performances of the corresponding crowd estimation technique calculator 204 by determining a variance of the F-score 304 for the plurality of performances of the crowd estimation technique. F-score is a measure of performance based on the number of humans not detected and other regions falsely detected as humans. The performance modeling module 206 may determine the variance of the F-score (F-score distribution) 304 with respect to a mean of F-scores for the multiple performances of the crowd estimation technique calculator 204 and then determine an indicator of performance of the crowd estimation technique calculator 204 in response to both the variance of the F-score for the multiple performances of the crowd estimation technique calculator 204 and the F-score distribution with respect to the mean of F-scores for the multiple performances of the crowd estimation technique calculator 204.

Figure 6:
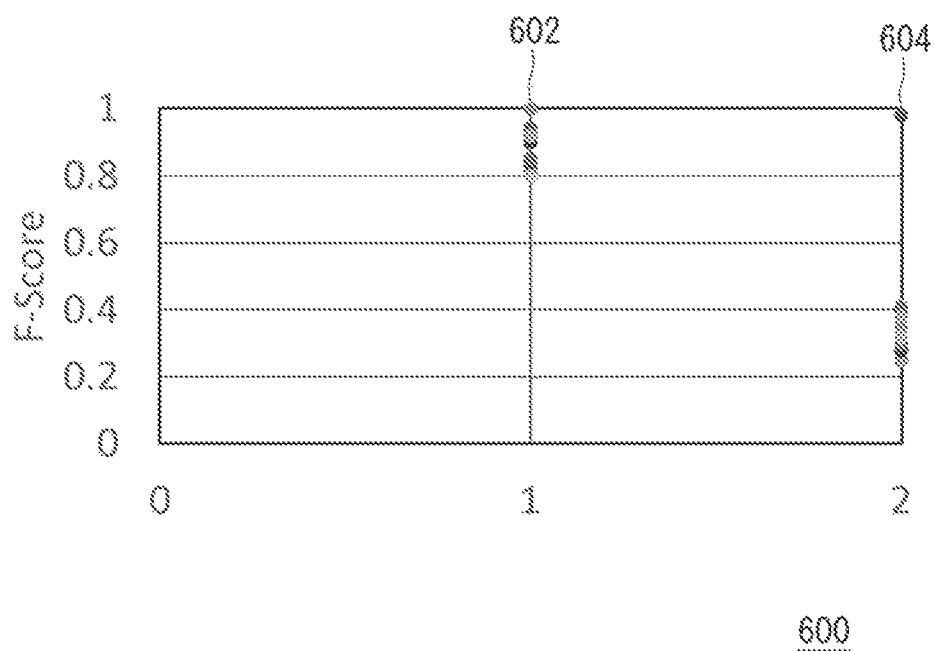
FIG. 6 depicts a graph of F-score variance for two crowd levels in accordance with the present embodiment.

FIG. 6 depicts a graph 600 showing F-score variance at a first crowd level 602 and a second crowd level 604. The F-score for samples at different crowd levels is used to find the F-Score variance at these crowd levels. The variance V(Fcr) of F-scores at a particular crowd level can be calculated from Equation (2) below.

$$V(Fcr) = \frac{\sum_{i=1}^{M}(F_{cr}^i - \mu)^2}{M-1} \qquad (2)$$

where cr is low or high crowd level, M is the number of samples, $\mu$ is a mean of F-scores and $F_{cr}^i$ is the F-score for the $i^{th}$ sample. If $V(F_{low}) \ll V(F_{high})$ and $\mu_{low} \gg \mu_{high}$, the particular crowd estimation technique calculator 204 being performance modeled by the corresponding performance modeling module 206 is suitable for low crowd level estimation.

Figure 7:
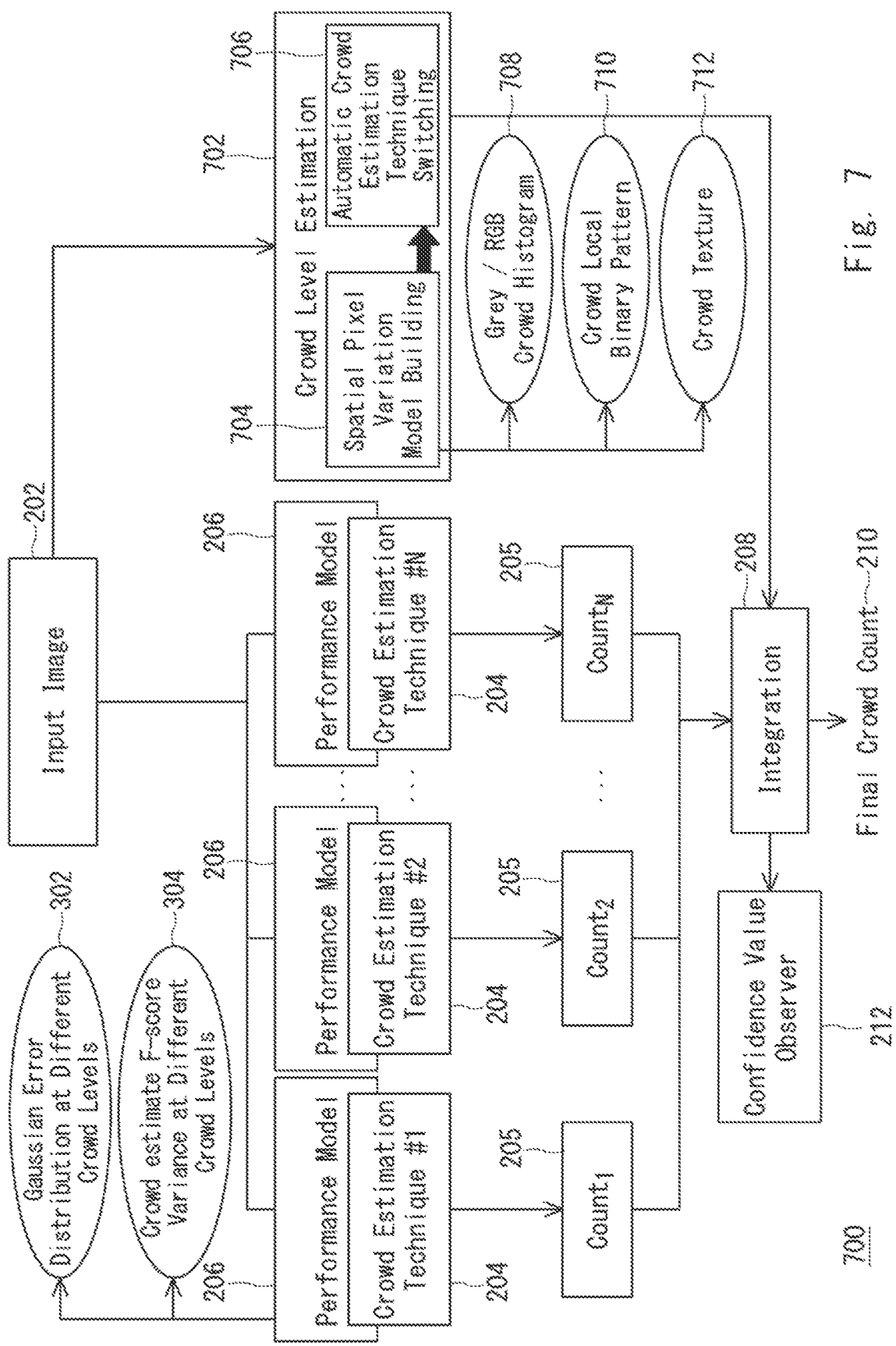
FIG. 7 depicts a diagram of a system for crowd level estimation in accordance with a third aspect of the present embodiment.

Referring to FIG. 7, a diagram 700 depicts a system for crowd level estimation in accordance with a third aspect of the present embodiment. In accordance with this third aspect, a crowd level estimation module 702 provides an estimated crowd level to the crowd estimation technique integration module 208 for use in selecting a most appropriate one of the crowd estimation technique calculators 204. The crowd level estimation module 702 can estimate a crowd level of the crowd in the input image received by the input module 202 in response to a crowd density level. This could be accomplished by focusing on a region of interest within the image. The input module 202 could receive the input image of the crowd and determine the region of interest within the input image of the crowd. Then, the crowd level estimation module 702 could estimate the crowd level of the crowd within the region of interest of the input image in response to the crowd density level at that region of interest.

The crowd level estimation module 702 may include a spatial pixel variation model building unit 704 for modeling spatial variations of each of a plurality of crowd levels in response to pixel density variations thereof to generate multiple models of crowd level spatial variations. The crowd level estimation module 702 can then estimate the crowd level for automatic crowd estimation technique switching 706 by determining a similarity of the input image of the crowd to each of the models of crowd level spatial variations built by the spatial pixel variation model building unit 704 and estimating the crowd level of the crowd in the input image in response to a most similar one of the models of crowd level spatial variations.

In regards to determining the most similar one of the models of crowd level spatial variations, the crowd level estimation module 702 can estimate the crowd level of the crowd in the input image in response to a probability density function of a similarity of the input image of the crowd and each of the plurality of models of crowd level spatial variations. More specifically, the crowd level estimation module estimates the crowd level of the crowd in the input image in response to a best fit model of the plurality of models of crowd level spatial variations as determined by the probability density function of the similarity of the input image of the crowd and each of the plurality of models of crowd level spatial variations.

The spatial pixel variation model building unit 704 can generate the plurality of models of crowd level spatial variations in response to one or more of a grayscale crowd histogram or a red-green-blue (RGB) crowd histogram 708, a crowd local binary pattern 710 or a crowd texture 712. The automatic crowd estimation technique switching 706 of the crowd level estimation module 702 can switch crowd estimation techniques in response to an estimated discrete level of the crowd in the input image.

Thus, crowd levels such as low crowd levels and high crowd levels are estimated to select or to assign higher confidence values to crowd estimation technique calculators 204 which perform better at the estimated crowd level. The crowd level estimation module 702 is accomplished by first spatial pixel variation model building by the spatial pixel variation model building unit 704 and then automatic crowd estimation technique switching 706.

Figure 8:
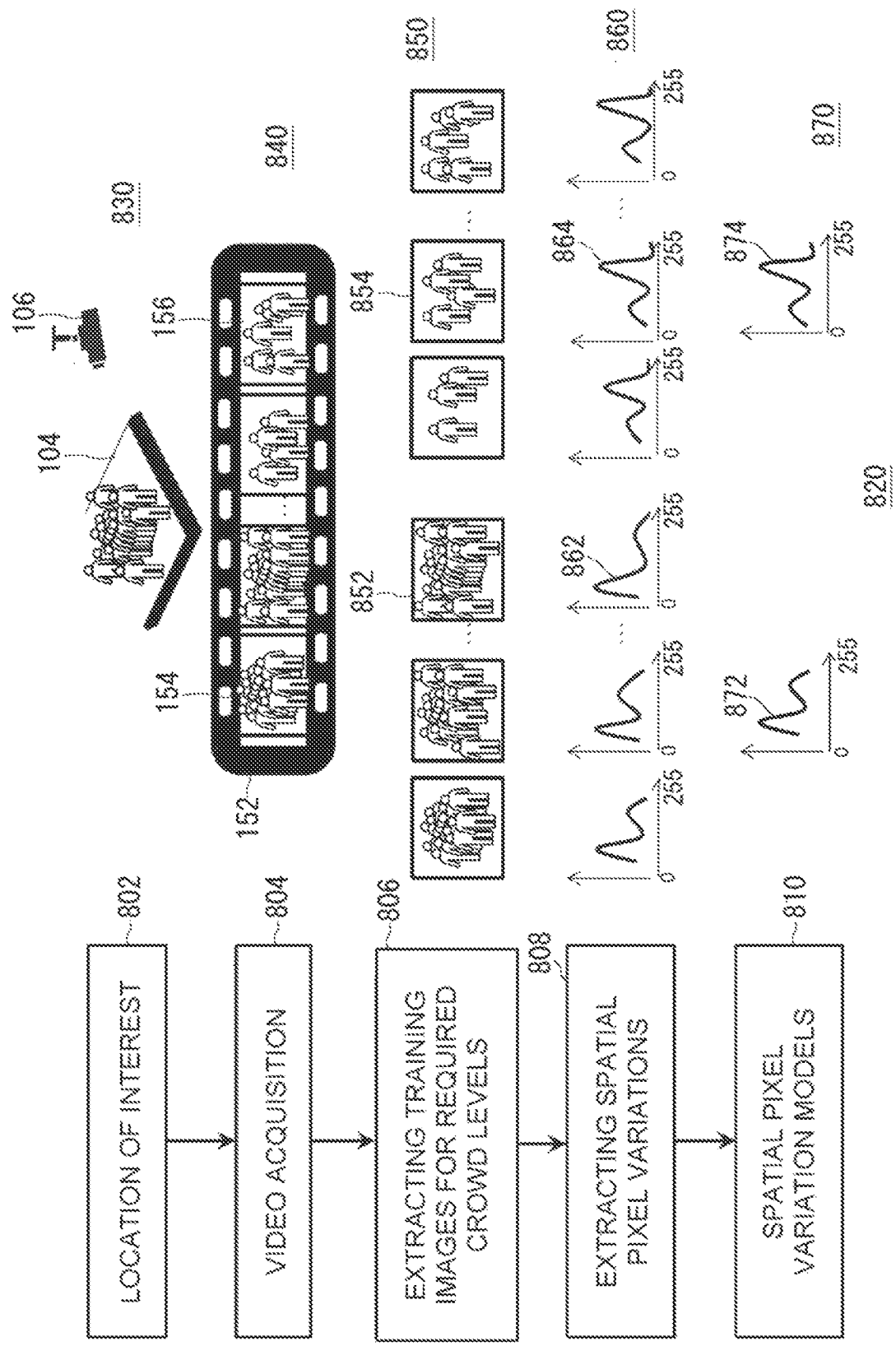
FIG. 8 depicts a spatial pixel variation crowd estimation technique in accordance with the present embodiment.

Referring to FIG. 8, a flow chart 800 and illustrations 820 depict the operation of the crowd level estimation module 702 where estimation is based on modeling spatial variations of crowd levels by the spatial pixel variation model building unit 704. The flowchart 800 depicts the spatial variation modeling process in accordance with the present embodiment. At a location of interest (Step 802), the camera 106 acquires images of the crowd 102 (Step 804). Training images of the crowd are extracted for required crowd levels (e.g., high crowd level or low crowd level) (Step 806). The spatial pixel variations are then extracted from the training images (Step 808) and spatial pixel variation models are developed for the required crowd levels (Step 810).

Turning to the illustrations 820, each of the steps of the flowchart is shown pictorially. At an illustration 830, the camera 106 monitoring the location (location of interest) 104 is selected. In an illustration 840, the video (media 152) is recorded from the location of interest 104 covering different crowd levels ranging from high crowd levels in images 154 to low crowd levels in images 156.

The illustrations 850 correspond to Step 806 in the flowchart 800 where training images 852 for high crowd levels and training images 854 for low crowd levels are extracted. In this manner, training images (image frames) 852, 854 with different crowd levels covering a 'no person case' to 'a fully crowded case' are extracted from the video (video clip) 152 recorded at Step 804 in the flowchart 800.

At the next Step 808, spatial pixel variations are extracted. A histogram approach for extracting spatial pixel variation is provided as an example in the illustration 860. A grey scale histogram of an image is a frequency representation of the pixel intensities grouped at discrete pixel intensity levels called bins. Grey scale histograms 862, 864 of all the extracted image frames 852, 854 are recorded with 256 bins. The image-histogram pairs are grouped into high crowd level image frames 852 and histograms 862 and low crowd level images 854 and histograms 864 based on the number of humans in the images 852, 854.

At each crowd level, a bin-wise frequency averaging is performed considering all the image-histogram pairs. The averaging forms histogram models 872, 874 for each crowd level as pictured in the illustration 870. In operation, incoming image images (imageframes) 154, 156 are compared against these histogram models 872, 874 to estimate a crowd level for each image frame.

Figure 9:
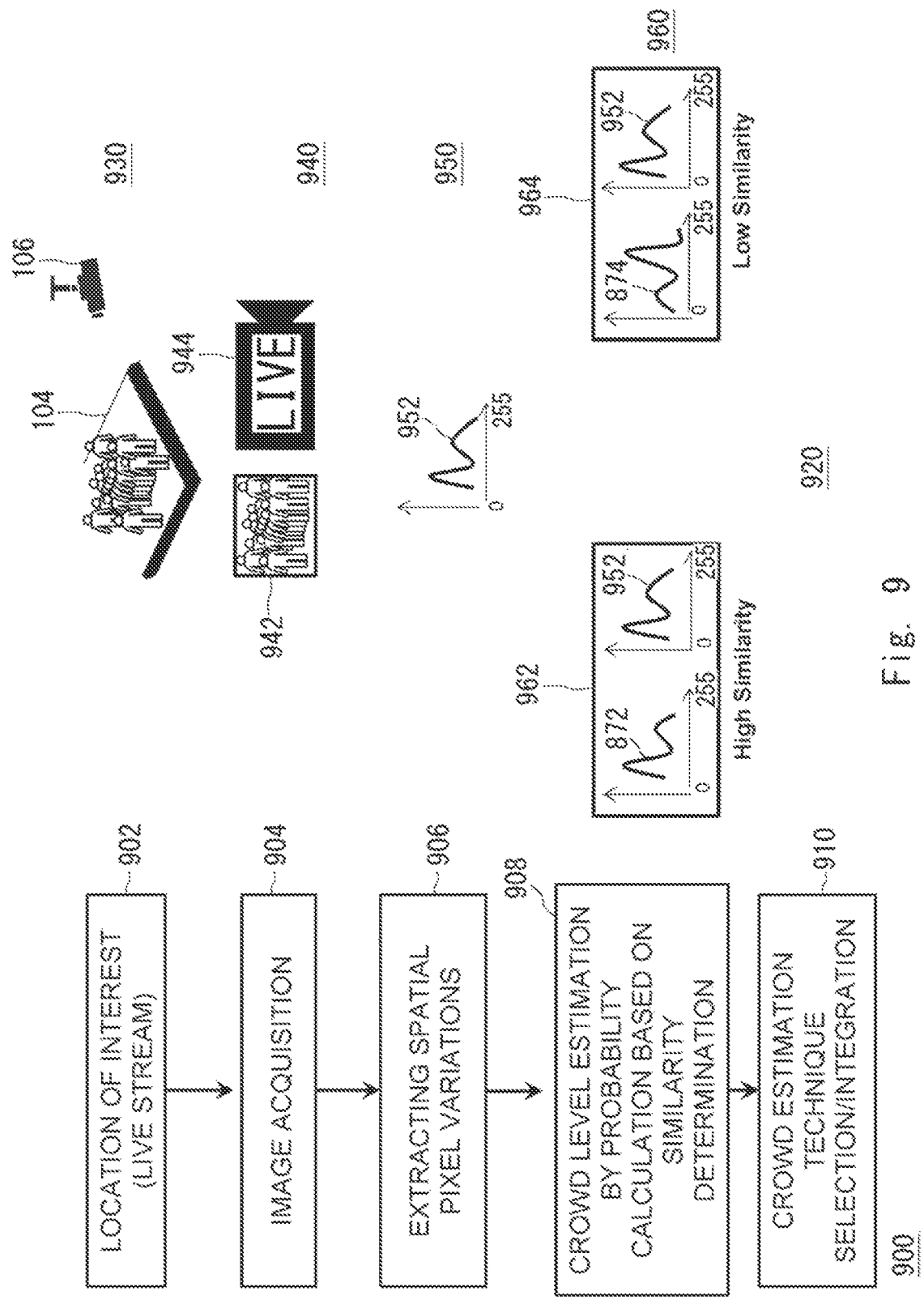
FIG. 9 depicts automatic crowd estimation technique switching in accordance with the present embodiment.

Referring to FIG. 9, a flow chart 900 and illustrations 920 depict the operation of the crowd level estimation module 702 where estimation is based on automatic crowd estimation technique switching by the automatic crowd estimation technique switching 706 (FIG. 7). The flowchart 900 depicts the automatic crowd estimation technique switching process in accordance with the present embodiment. At a location of interest (Step 902), the camera 106 acquires a live stream video of images of the crowd 102 (Step 904). The spatial pixel variations are then extracted from the acquired images (Step 906) and crowd level estimation is performed by probability calculation based on similarity determination (Step 908). Processing then selects or integrates the appropriate crowd estimation technique calculator 204 (Step 910).

Turning to the illustrations 920, each of the steps of the flowchart are shown pictorially. At an illustration 930, the camera 106 initiates a live video stream of the location of interest 104. In an illustration 940, the automatic periodic capture of image frames of the crowd 942 is initiated for the location of interest 104. The user can define an appropriate time interval for image frame capture 944.

At the next Step 906, spatial pixel variations are extracted. An exemplary histogram approach for extracting spatial pixel variation 950 extracts a grey scale histogram 952 of an image as a frequency representation of the pixel intensities grouped at discrete pixel intensity levels.

At the next Step 908, the histogram 952 is compared against all the histogram models 872, 874 generated in the illustration (model building stage) 870 (FIG. 8). The histogram 952 is compared to the histogram model 872 at the illustration 962 and compared to the histogram model 874 at the illustration 964. The comparison is performed by calculating similarity scores between the histogram 952 of the incoming image frame and the histogram models 872, 874. Examples of the similarity calculation methods include the correlation method, the Bhattacharya distance method, the Chi-square method and the intersection method. The similarity calculation results in each similarity method acting as a classifier on whether the incoming image frame resembles a high crowd level (the illustration 962) or a low crowd level (the illustration 964).

For example, using four different pixel variation modeling methods with each method outputs histogram model 872 or 874 being compared against that of an incoming image frame 942 by four different similarity calculations would result in sixteen classifications. A Probability Density Function (PDF) can be constructed based on these sixteen classifications as shown in Equations (3) and (4).

$$P(X = \text{high}) = \frac{\text{Total Number of High crowd level classifications}}{16} \quad (3)$$

$$P(X = \text{low}) = \frac{\text{Total Number of low crowd level classifications}}{16} \quad (4)$$

At Step 910, an incoming image frame 942 is classified to a particular crowd level based on the highest probability calculated at step 908. For crowd estimation technique selection at Step 910, the crowd estimation technique calculator 204 with the lowest σ or V(Fcr) with a high Fcr at the estimated crowd level is selected.

For crowd estimation technique integration at Step 910, the final count estimate ($F_{count}$) is calculated using Equation (5).

$$F_{count} = \text{round}\left(\frac{\sum_{i=1}^{N} Z_{ri} \times count_i}{N}\right) \quad (5)$$

where i=1 to N crowd estimation techniques and $Z_{ri}$ is a re-weighted confidence value calculated by Equation (6).

$$Z_{ri} = 1 - Z_{normi} \quad (6)$$

where $Z_{normi}$ is the normalized confidence value in the range [0,1] calculated using Equation (7).

$$Z_{normi} = \frac{Z_i - \min(Z)}{\max(Z) - \min(Z)} \quad (7)$$

where, Z can either be a set of σ or a set of V(Fcr) generated for all the crowd estimation technique calculators 204. For example, where results from a first crowd estimation technique calculator 204 (e.g., a combined head pattern estimation technique) and a second crowd estimation technique calculator 204 (e.g., an individual head pattern estimation technique) can be represented as Count₁ and Count₂, Equation (8) shows mean averaging of the confidence values.

$$(Z_1 \times Count_1 + Z_2 \times Count_2)/2 \quad (8)$$

where $Z_1 >> Z_2$ and $Z_1 + Z_2 = 1$ (for example $Z_1$ could be 1 and $Z_2$ could be 0).

Figure 10:
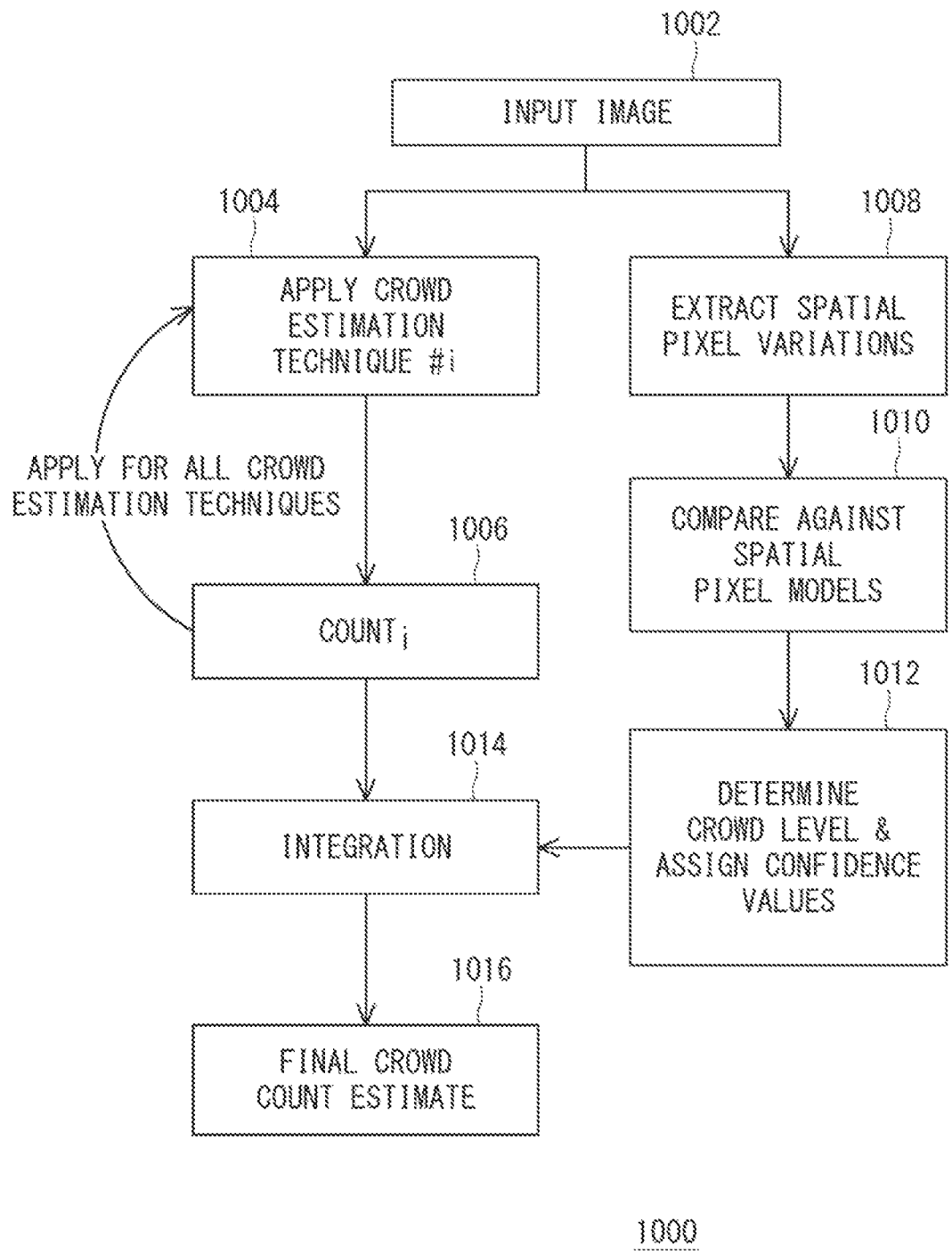
FIG. 10 depicts a flowchart of a method for crowd level estimation in accordance with the present embodiment.

Referring to FIG. 10, a flowchart 1000 depicts a method for crowd level estimation in accordance with the present embodiment. When an input image of a crowd is received (Step 1002), each crowd estimation technique is applied to the image (Step 1004) and crowd counts are calculated for each of the crowd estimation techniques (Step 1006). At the same time, spatial pixel variations are extracted from the received input image (Step 1008). The extracted spatial pixel variations are compared against spatial pixel models to find the highest similarity as described above (Step 1010). The crowd level is determined from the comparisons in Step 1010 and confidence values are assigned (Step 1012). The counts calculated for each of the crowd estimation techniques in Step 1006 are then integrated with the crowd level/confidence values determined/assigned in Step 1012 (Step 1014) to estimate the final crowd count (Step 1016).

Figure 11:
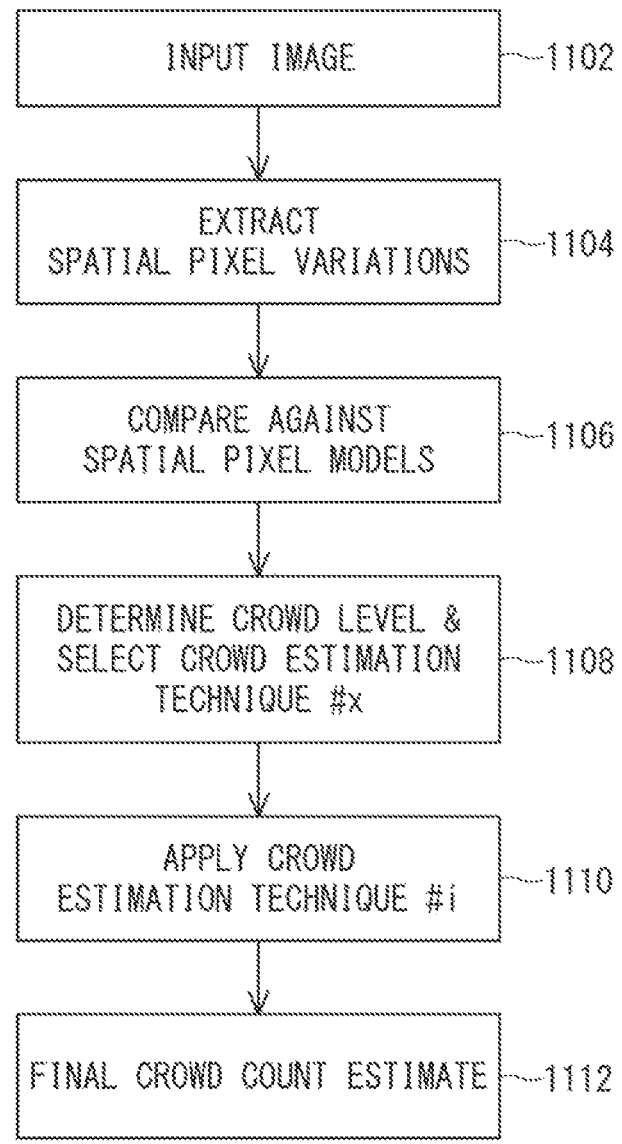
FIG. 11 depicts a flowchart for selecting the best performing crowd estimation technique in accordance with the present embodiment.

Methods in accordance with the present embodiment can also be used to select the best performing crowd estimation technique. In this case, the incoming image frame is not processed by all crowd estimation techniques; only the selected techniques will process the incoming image frame. Referring to FIG. 11, a flowchart 1100 depicts this selection process. The input image is received (Step 1102) and spatial pixel variations are extracted (Step 1104). The spatial pixel variations are compared against all spatial pixel models (Step 1106) to determine the crowd level and select the crowd estimation technique for that crowd level (Step 1108). The selected crowd estimation technique is applied (Step 1110) to estimate the final crowd count (Step 1112).

Thus, it can be seen that the present embodiment provides methods and systems for real time robust and optimized crowd estimation. When analyzed closely, it is possible to identify and/or model multiple techniques which can complement each other. In accordance with present embodiments, methods and systems to automatically switch between these crowd estimation techniques depending on a current crowd level (low crowd level, high crowd level) and other parameters tap these advantages to provide optimized real time crowd estimation with improved accuracy in a variety of crowd conditions and crowd locations.

While exemplary embodiments have been presented in the foregoing detailed description of the present disclosure, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the present disclosure, it being understood that various changes may be made in the function and arrangement of steps and method of operation described in the exemplary embodiment without departing from the scope of the present disclosure as set forth in the appended claims.

Figure 12:
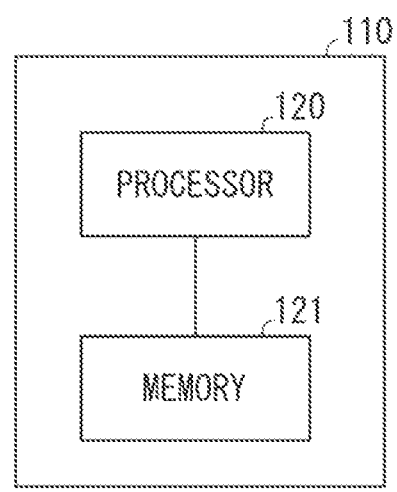
FIG. 12 depicts a configuration example of the computer device according to the present embodiment.

In the aforementioned embodiment, the functions of the system for crowd estimation depicted as the diagrams 200, 300, and 700 may be implemented, for example, by a processor included in a computer device operating in accordance with a program. FIG. 12 depicts a configuration example of the computer device according to the present embodiment. The computer device 110 includes a processor 120 and a memory 121. The memory 121 includes a volatile memory and/or a non-volatile memory. The memory 121 stores a software (computer program) to be executed on the processor 120 in, for example, the non-volatile memory. The processor 120 is, for example, a Central Processing Unit (CPU) or the like, and the control and the operations executed by the computer device 110 are achieved by, for example, the processor 120 operating in accordance with the computer program loaded from the memory 121. The processor 120 may load the computer program from an external memory of the computer device 110 and execute the loaded computer program instead of loading the computer program from the memory 121 in the computer device 110.

The above computer program can be stored and provided to the computer device using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

For example, the whole or part of the exemplary embodiments disclosed above can be described as, but not limited to, the following supplementary notes.

(Supplementary Note 1)

A method for crowd level estimation comprising:
receiving an input image of a crowd; and
estimating a crowd level of the crowd in the input image in response to a crowd density level.

(Supplementary Note 2)

The method according to Supplementary note 1 wherein estimating the crowd level comprises:
determining a region of interest within the input image of the crowd; and
estimating a crowd level of the crowd within the region of interest of the input image in response to a crowd density level.

(Supplementary Note 3)

The method according to Supplementary note 1 or Supplementary note 2 wherein estimating the crowd level in response to the crowd density level comprises:
determining a similarity of the input image of the crowd to each of a plurality of models of crowd level spatial variations; and
estimating the crowd level of the crowd in the input image in response to a most similar one of the plurality of models of crowd level spatial variations.

(Supplementary Note 4)

The method according to Supplementary note 3 wherein determining the similarity of the input image of the crowd to each of the plurality of models of crowd level spatial variations comprises modeling spatial variations of each of a plurality of crowd levels in response to pixel density variations thereof to generate the plurality of models of crowd level spatial variations.

(Supplementary Note 5)

The method according to Supplementary note 3 or Supplementary note 4 wherein estimating the crowd level of the crowd in the input image comprises estimating the crowd level of the crowd in the input image in response to a probability density function of a similarity of the input image of the crowd and each of the plurality of models of crowd level spatial variations.

(Supplementary Note 6) The method according to Supplementary note 5 wherein estimating the crowd level of the crowd in the input image further comprises estimating the crowd level of the crowd in the input image in response to a best fit model of the plurality of models of crowd level spatial variations as determined by the probability density function of the similarity of the input image of the crowd and each of the plurality of models of crowd level spatial variations.

(Supplementary Note 7)

The method according to Supplementary note 5 or Supplementary note 6 wherein the plurality of models of crowd level spatial variations comprises a model generated in response to a grayscale crowd histogram.

(Supplementary Note 8)

The method according to Supplementary note 5 or Supplementary note 6 wherein the plurality of models of crowd level spatial variations comprises a model generated in response to a red-green-blue (RGB) crowd histogram.

(Supplementary Note 9) The method according to Supplementary note 5 or Supplementary note 6 wherein the plurality of models of crowd level spatial variations comprises a model generated in response to a crowd local binary pattern.

(Supplementary Note 10)

The method according to Supplementary note 5 or Supplementary note 6 wherein the plurality of models of crowd level spatial variations comprises a model generated in response to crowd texture.

(Supplementary Note 11)

The method according to any one of Supplementary notes 1 to 10 wherein estimating the crowd level comprises estimating a discrete level of the crowd in the input image.

(Supplementary Note 12)

The method according to any one of Supplementary notes 1 to 11 wherein receiving the image of the crowd comprises:
receiving the image of the crowd; and
dividing the image of the crowd into a plurality of sub-regions, and
wherein estimating the crowd level of the crowd in the received image comprises estimating the crowd level of the crowd in each of the plurality of sub-regions in response to the crowd density for that one of the plurality of sub-regions.

(Supplementary Note 13)

A system for crowd level estimation comprising:
an input module for receiving an input image of a crowd; and
a crowd level estimation module for estimating a crowd level of the crowd in the input image in response to a crowd density level.

(Supplementary Note 14)

The system according to Supplementary note 13,
wherein the input module receives the input image of the crowd and determines a region of interest within the input image of the crowd, and
wherein the crowd level estimation module estimates the crowd level of the crowd within the region of interest of the input image in response to the crowd density level.

(Supplementary Note 15)

The system according to Supplementary note 13 or Supplementary note 14,
wherein the crowd level estimation module includes a spatial pixel variation model building unit for modeling spatial variations of each of a plurality of crowd levels in response to pixel density variations thereof to generate a plurality of models of crowd level spatial variations, and
wherein the crowd level estimation module estimates the crowd level by determining a similarity of the input image of the crowd to each of the plurality of models of crowd level spatial variations and estimating the crowd level of the crowd in the input image in response to a most similar one of the plurality of models of crowd level spatial variations.

(Supplementary Note 16)

The system according to Supplementary note 15 wherein the crowd level estimation module estimates the crowd level of the crowd in the input image in response to a probability density function of a similarity of the input image of the crowd and each of the plurality of models of crowd level spatial variations.

(Supplementary Note 17)

The system according to Supplementary note 16 wherein the crowd level estimation module estimates the crowd level of the crowd in the input image in response to a best fit model of the plurality of models of crowd level spatial variations as determined by the probability density function of the similarity of the input image of the crowd and each of the plurality of models of crowd level spatial variations.

(Supplementary Note 18)

The system according to any one of Supplementary notes 15 to 17 wherein the spatial pixel variation model building unit generates the plurality of models of crowd level spatial variations in response to one or more of a grayscale crowd histogram, a red-green-blue (RGB) crowd histogram, a crowd local binary pattern or a crowd texture.

(Supplementary Note 19)

The system according to any one of Supplementary notes 13 to 18 wherein the crowd level estimation module estimates a discrete level of the crowd in the input image.

(Supplementary Note 20)

The system according to any one of Supplementary notes 13 to 19, wherein the input module receives the image of the crowd and divides the image of the crowd into a plurality of sub-regions, and wherein the crowd level estimation module estimates the crowd level of the crowd in each of the plurality of sub-regions in response to the crowd density for that one of the plurality of sub-regions.

(Supplementary Note 21)

A computer readable medium storing a program for causing a computer to perform a method, the method comprising:

receiving an input image of a crowd;

determining a region of interest within the input image of the crowd;

determining a similarity of the region of interest within the input image of the crowd to each of a plurality of models of crowd level spatial variations, each of the plurality of models of crowd level spatial variations generated by modeling spatial variations of each of a plurality of crowd levels in response to pixel density variations thereof; and estimating the crowd level of the crowd in the region of interest within the input image in response to a most similar one of the plurality of models of crowd level spatial variations.

(Supplementary Note 22)

The computer readable medium according to Supplementary note 19, wherein the method further comprising generating at least some of the plurality of models of crowd level spatial variations by modeling spatial variations of each of the plurality of crowd levels in response to one or more of a grayscale crowd histogram, a red-green-blue (RGB) crowd histogram, a crowd local binary pattern or a crowd texture.

REFERENCE SIGNS LIST

200 System
202 Input module
204 Crowd estimation technique calculator
206 Performance modeling module
208 Crowd estimation technique integration module

The invention claimed is:

1. A method of deriving crowd information, the method comprising:

receiving a picture;

receiving information of a crowd density level regarding a first area of the picture;

receiving information of a crowd density level regarding a second area of the picture, the second area being different from the first area;

calculating first information of a crowd level regarding people in the first area based on the information of the crowd density level regarding the first area; and calculating second information of a crowd level regarding people in the second area based on the information of the crowd density level regarding the second area, wherein the calculating the first information and the second information comprises:

determining a similarity of the picture of the crowd and each of a plurality of models of crowd level spatial variations; and estimating a crowd level of the crowd in the picture in response to a most similar one of the plurality of models of crowd level spatial variations, wherein the most similar one of the plurality of models of crowd level spatial variations is determined in response to a probability density function of the similarity of the picture of the crowd and each of the plurality of models of crowd level spatial variations.

2. The method according to claim 1, wherein the first information includes number of people of the first area, and the second information includes number of people of the second area.

3. The method according to claim 1, further comprising:

calculating third information regarding people of the picture based on information in the picture.

4. The method according to claim 3, wherein the information in the picture includes the first area of the picture and the second area of the picture.

5. The method according to claim 3, wherein the information in the picture includes the first information and the second information.

6. The method according to claim 3, wherein the third information includes a density of the picture.

7. The method according to claim 3, wherein the first information includes number of people of the picture.

8. A non-transitory computer readable medium storing a program for causing a computer to execute the following steps of:

receiving a picture;

receiving information of a crowd density level regarding a first area of the picture;

receiving information of a crowd density level regarding a second area of the picture, the second area being different from the first area;

calculating first information of a crowd level regarding people in the first area based on the information of the crowd density level regarding the first area; and calculating second information of a crowd level regarding people in the second area based on the information of the crowd density level regarding the second area, wherein the calculating the first information and the second information comprises:

determining a similarity of the picture of the crowd and each of a plurality of models of crowd level spatial variations; and estimating a crowd level of the crowd in the picture in response to a most similar one of the plurality of models of crowd level spatial variations,
wherein the most similar one of the plurality of models of crowd level spatial variations is determined in response to a probability density function of the similarity of the picture of the crowd and each of the plurality of models of crowd level spatial variations.

9. The non-transitory computer readable medium according to claim 8, wherein the first information includes number of people of the first area, and the second information includes number of people of the second area.

10. The non-transitory computer readable medium according to claim 8, further comprising:
calculating third information regarding people of the picture based on information in the picture.

11. The non-transitory computer readable medium according to claim 10, wherein the information in the picture includes the first area of the picture and the second area of the picture.

12. The non-transitory computer readable medium according to claim 10, wherein the information in the picture includes the first information and the second information.

13. The non-transitory computer readable medium according to claim 10, wherein the third information includes a density of the picture.

14. The non-transitory computer readable medium according to claim 10, wherein the first information includes number of people of the picture.

15. A server comprising;
at least one storage device configured to store instructions; and
at least one processor configured to execute the instructions to:
receive a picture;
receive information of a crowd density level regarding a first area of the picture;
receive information of a crowd density level regarding a second area of the picture, the second area being different from the first area;
calculate first information of a crowd level regarding people in the first area based on the information of the crowd density level regarding the first area; and
calculate second information of a crowd level regarding people in the second area based on the information of the crowd density level regarding the second area,
wherein the calculating the first information and the second information comprises:
determining a similarity of the picture of the crowd and each of a plurality of models of crowd level spatial variations; and
estimating a crowd level of the crowd in the picture in response to a most similar one of the plurality of models of crowd level spatial variations,
wherein the most similar one of the plurality of models of crowd level spatial variations is determined in response to a probability density function of the similarity of the picture of the crowd and each of the plurality of models of crowd level spatial variations.

* * * * *